(12) United States Patent
Kim et al.

(10) Patent No.: US 11,942,642 B1
(45) Date of Patent: Mar. 26, 2024

(54) ELECTROLYTES AND COMPONENTS THEREOF

(71) Applicant: Rivian IP Holdings, LLC, Plymouth, MI (US)

(72) Inventors: Judith Alvarado Kim, San Leandro, CA (US); Liyuan Sun, Mountain View, CA (US); Soo Kim, Fremont, CA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 39 days.

(21) Appl. No.: 18/049,859

(22) Filed: Oct. 26, 2022

(51) Int. Cl.
| | |
|---|---|
| *H01M 4/62* | (2006.01) |
| *H01M 4/02* | (2006.01) |
| *H01M 10/0565* | (2010.01) |
| *H01M 10/0567* | (2010.01) |
| *H01M 10/0568* | (2010.01) |
| *H01M 10/0569* | (2010.01) |

(52) U.S. Cl.
CPC ......... *H01M 4/62* (2013.01); *H01M 10/0565* (2013.01); *H01M 10/0567* (2013.01); *H01M 10/0568* (2013.01); *H01M 10/0569* (2013.01); *H01M 2004/028* (2013.01); *H01M 2300/0028* (2013.01); *H01M 2300/0082* (2013.01)

(58) Field of Classification Search
CPC .. H01M 4/62; H01M 10/0565; H01M 10/567; H01M 10/0569
See application file for complete search history.

(56) References Cited

U.S. PATENT DOCUMENTS

| | | | | |
|---|---|---|---|---|
| 2019/0198865 | A1* | 6/2019 | Kim | H01M 4/366 |
| 2019/0237747 | A1* | 8/2019 | Cho | H01M 4/525 |
| 2020/0028167 | A1* | 1/2020 | Yamada | H01M 10/0562 |
| 2021/0265654 | A1* | 8/2021 | Vereecken | H01M 10/0525 |
| 2021/0296635 | A1* | 9/2021 | Yoshima | H01M 4/622 |

* cited by examiner

*Primary Examiner* — Brian R Ohara
(74) *Attorney, Agent, or Firm* — Foley & Lardner LLP

(57) ABSTRACT

Provided herein is an apparatus. The apparatus can include a battery cell. The battery cell can include an electrode. The apparatus can include a first solid electrolyte interphase on the electrode. The first solid electrolyte interphase can be formed from a first electrolyte having a salt concentration greater than or equal to 1 M. The apparatus can include a second solid electrolyte interphase on the electrode. The second solid electrolyte interphase can be formed from a second electrolyte different from the first electrolyte.

22 Claims, 17 Drawing Sheets

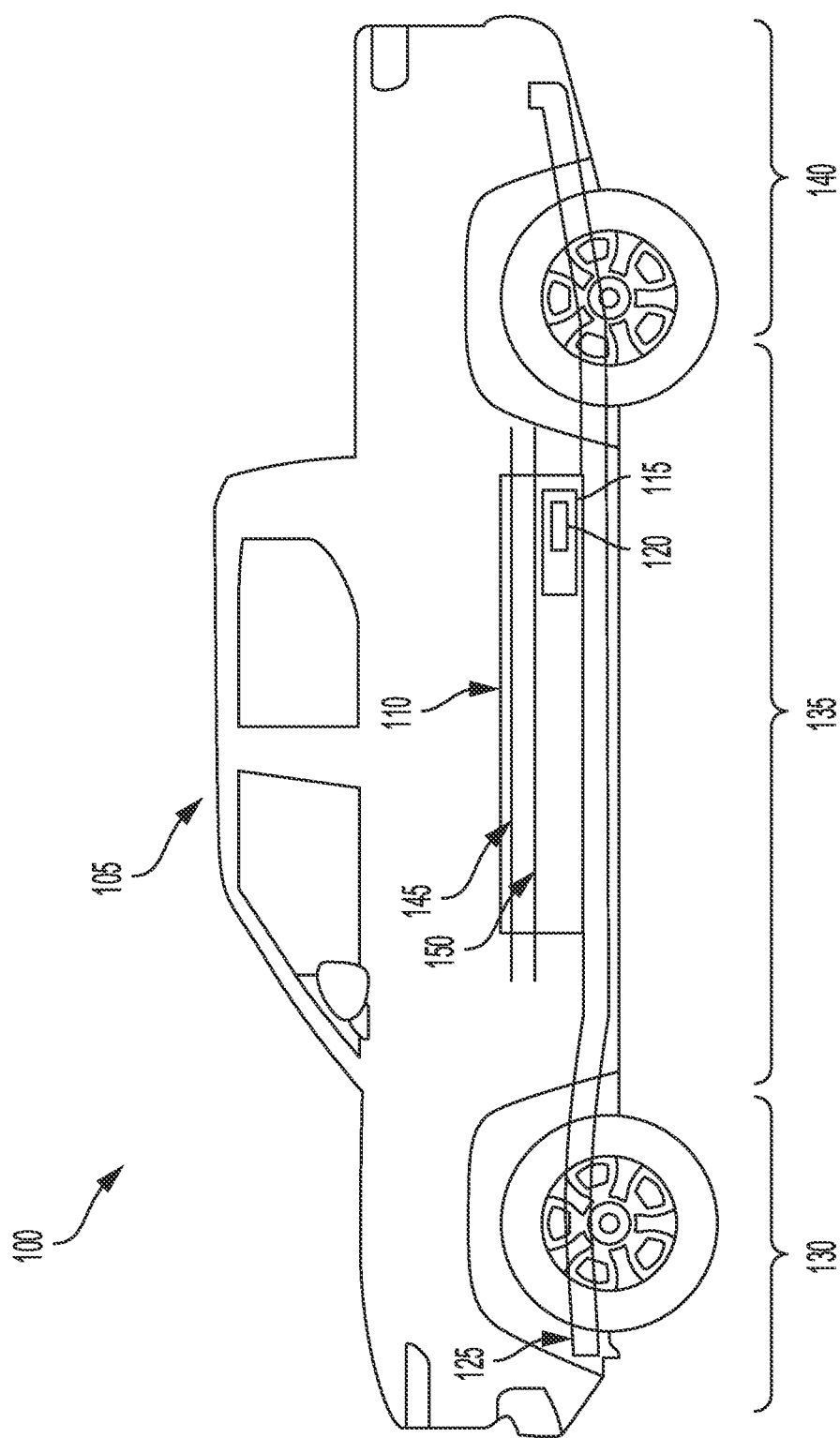

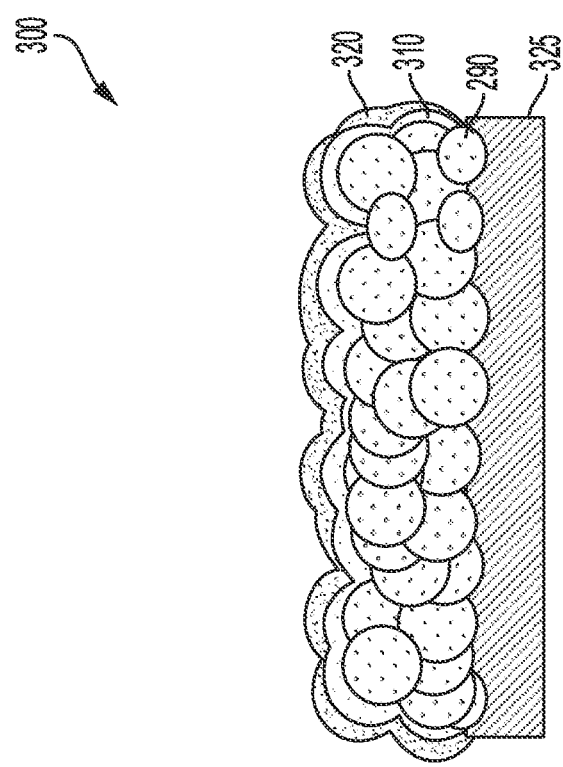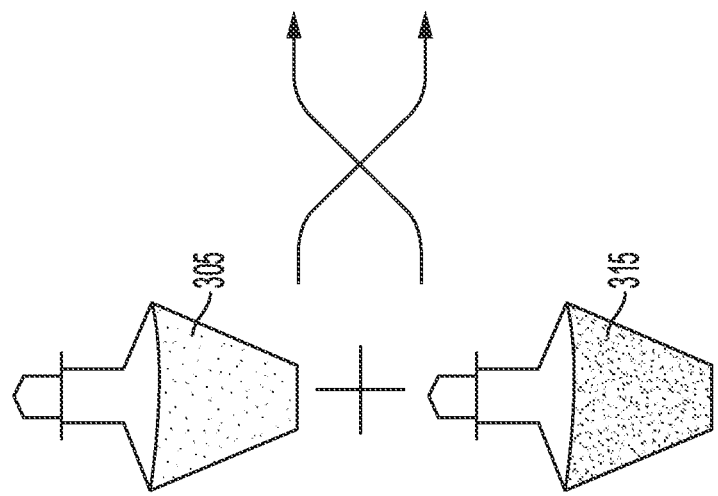
FIG. 3

ELECTROLYTES AND COMPONENTS THEREOF

INTRODUCTION

Batteries can have different power capacities to charge and discharge power to operate machines.

SUMMARY

Evaporation of the liquid electrolyte during the filling process of lithium-ion battery cells can negatively alter the electrolyte composition and affect the formation of the solid electrolyte interphase (SEI) on battery cell electrodes. The solutions described herein can reduce electrolyte evaporation and improve the solid electrolyte interphase.

At least one aspect is directed to an apparatus. The apparatus can include a battery cell. The battery cell can include an electrode. The apparatus can include a first solid electrolyte interphase on the electrode. The first solid electrolyte interphase can be formed from a first electrolyte having a salt concentration greater than or equal to 1 M. The apparatus can include a second solid electrolyte interphase on the electrode. The second solid electrolyte interphase can be formed from a second electrolyte different from the first electrolyte.

At least one aspect is directed to an apparatus. The apparatus can include a battery cell. The battery call can include an electrode. The apparatus can include a first solid electrolyte interphase on the electrode. The first solid electrolyte interphase can be formed from a first electrolyte. The apparatus can include a second solid electrolyte interphase on the electrode. The second solid electrolyte interphase can be formed from a second electrolyte different from the first electrolyte.

At least one aspect is directed to a method. The method can include providing a battery cell. The battery cell can include an electrode. The method can include disposing a first electrolyte in the battery cell. The first electrolyte can have a salt concentration greater than or equal to 1 M. The first electrolyte can form a first solid electrolyte interphase on the electrode. The method can include disposing a second electrolyte in the battery cell. The second electrolyte can be different from the first electrolyte. The second electrolyte can be configured to form a second solid electrolyte interphase on the first solid electrolyte interphase.

At least one aspect is directed to an electric vehicle. The electric vehicle can include a battery cell. The battery cell can include an electrode. The electric vehicle can include a first electrolyte disposed in the battery cell. The first electrolyte can have a salt concentration greater than or equal to 1 M. The first electrolyte can form a first solid electrolyte interphase on the electrode. The electric vehicle can include a second electrolyte disposed in the battery cell. The second electrolyte can be different from the first electrolyte. The second electrolyte can form a second solid electrolyte interphase on the first solid electrolyte interphase.

At least one aspect is directed to a system. The system can include a battery cell. The battery cell can include an electrode. The system can include a first electrolyte disposed in the battery cell. The first electrolyte can have a salt concentration greater than or equal to 1 M. The first electrolyte can form a first solid electrolyte interphase on the electrode. The system can include a second electrolyte disposed in the battery cell. The second electrolyte can be different from the first electrolyte. The second electrolyte can form a second solid electrolyte interphase on the first solid electrolyte interphase.

At least one aspect is directed to a battery. The battery can include an electrode. The battery can include a first electrolyte having a salt concentration greater than or equal to 1 M. The first electrolyte can form a first solid electrolyte interphase on the electrode. The battery can include a second electrolyte different from the first electrolyte. The second electrolyte can form a second solid electrolyte interphase on the first solid electrolyte interphase.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1 depicts a cross-sectional view of an electric vehicle, according to an example implementation.

FIG. 3 depicts a perspective view of an apparatus, according to an example implementation.

DETAILED DESCRIPTION

Figure 2A:
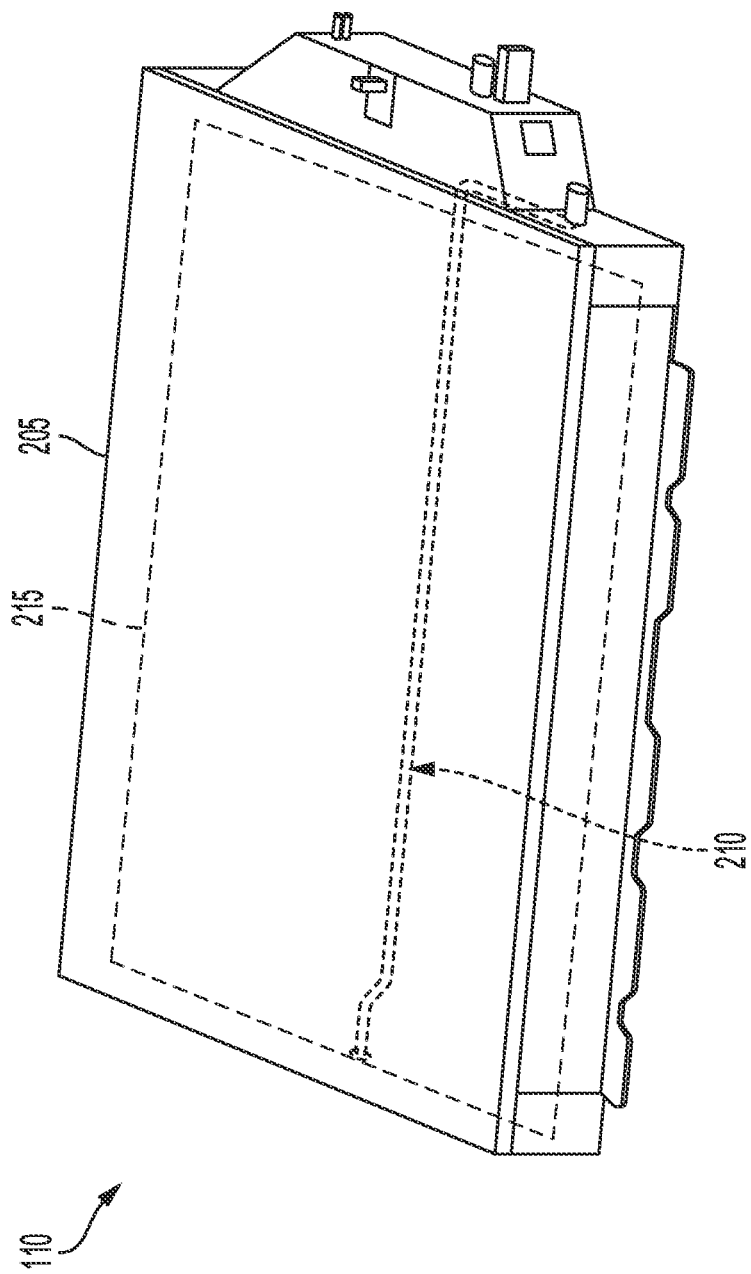
FIG. 2A depicts a battery pack, according to an example implementation.

Following below are more detailed descriptions of various concepts related to, and implementations of, methods, apparatuses, and systems for electrolyte formulations for filling processes. The electrolyte formulations of the present disclosure can be in batteries used to power electric vehicles and reduce greenhouse gas emissions by replacing internal combustion engines. The various concepts introduced above and discussed in greater detail below may be implemented in any of numerous ways.

The present disclosure is directed to systems and methods for electrolyte formulations for filling processes for battery cells. Evaporation of the electrolyte during the filling process of battery cells can alter the electrolyte composition and affect the formation of the solid electrolyte interphase on battery cell electrodes. Electrolyte evaporation can depend on the composition of the electrolyte and filling conditions. Challenges with implementing high voltage cathode materials can include transition metal dissolution, gas generation, and capacity decay during cycling and under battery cell room temperature and high temperature storage conditions. Challenges with implementing high mechanical strain cathode and anode blends can include capacity loss due to mechanical and chemical instabilities during battery cell cycling. Cathode and anode materials can be negatively affected by unstable portion of the solid electrolyte interphase (e.g., soluble phases such as Li—P—F species) and/or continuous lithium consumption that reduces battery cell performance.

Systems and methods of the present technical solution can provide an apparatus for electrolyte formulations for filling processes. The apparatus can provide a combination of different electrolyte formulations and multiple filling steps. The battery cell can include an electrode. The apparatus can include a first solid electrolyte interphase on the electrode. The first solid electrolyte interphase can be formed from a first electrolyte having a salt concentration greater than or equal to 1 M. The apparatus can include a second solid electrolyte interphase on the electrode. The second solid electrolyte interphase can be formed from a second electrolyte different from the first electrolyte.

The disclosed solutions have a technical advantage of improving battery cell performance. The solutions can reduce electrolyte evaporation and thus improve the solid electrolyte interphase. The solutions can enhance cathode and anode interface stability. The solutions can be customized for specific cell chemistries and/or performance targets. The solutions can improve thermal stability during the electrochemical filling process. The solutions can generate a dual solid electrolyte interphase layer for the cathode and/or the anode to improve the versatility and performance of the electrolyte.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
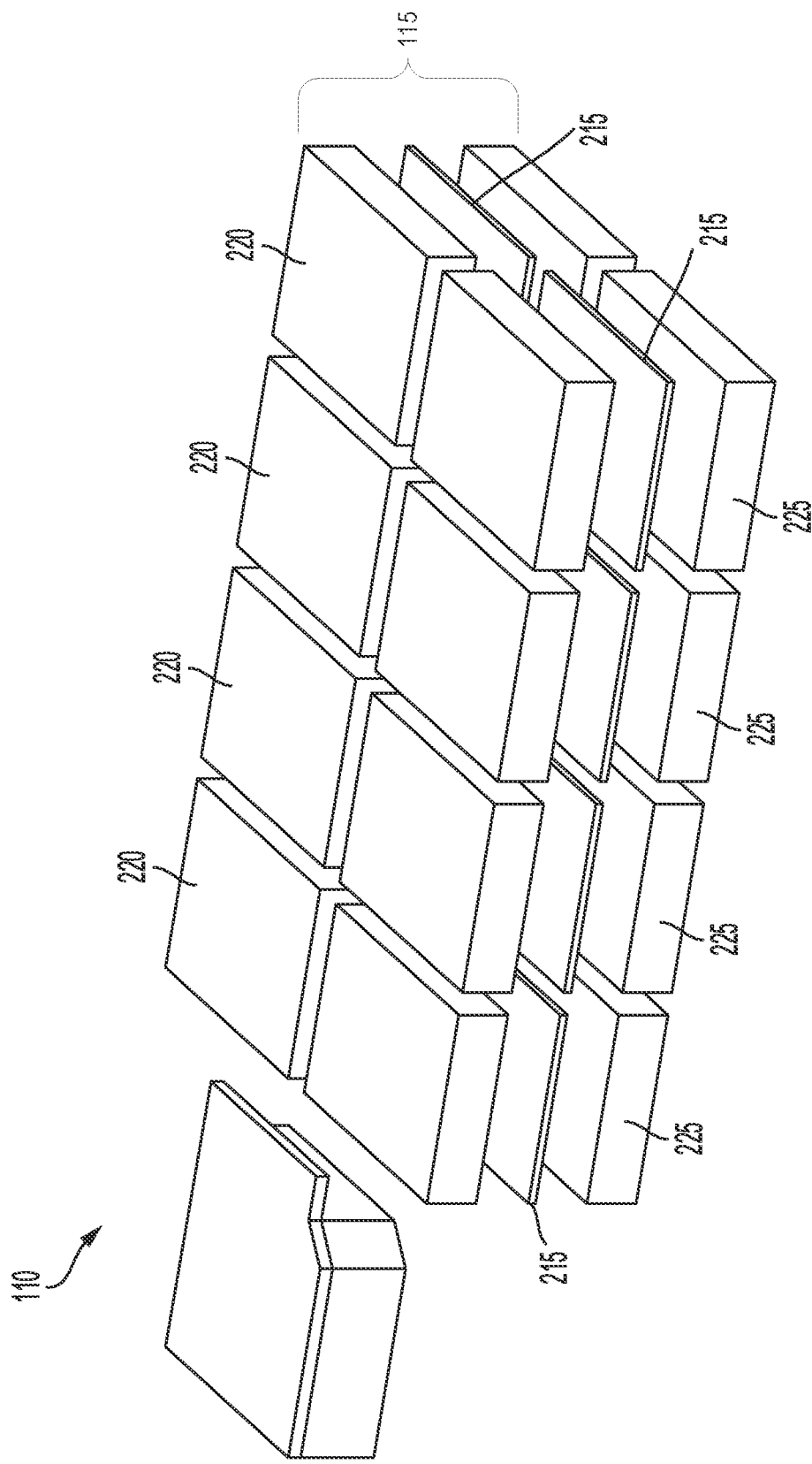
FIG. 2B depicts a battery module, according to an example implementation.
Figure 2C:
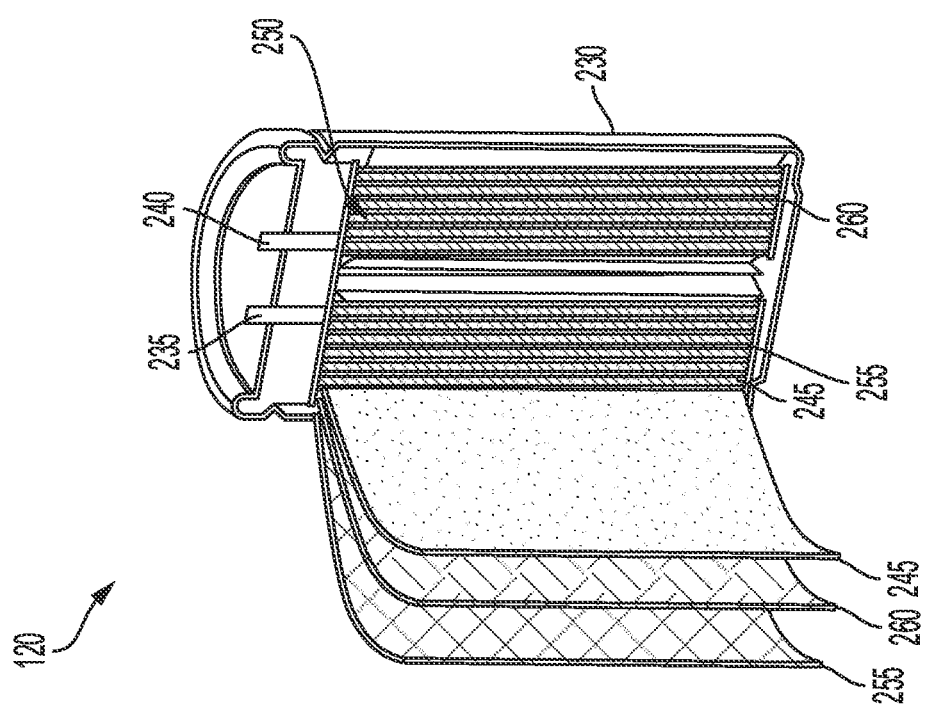
FIG. 2C depicts a cross-sectional view of a battery cell, according to an example implementation.
Figure 2D:
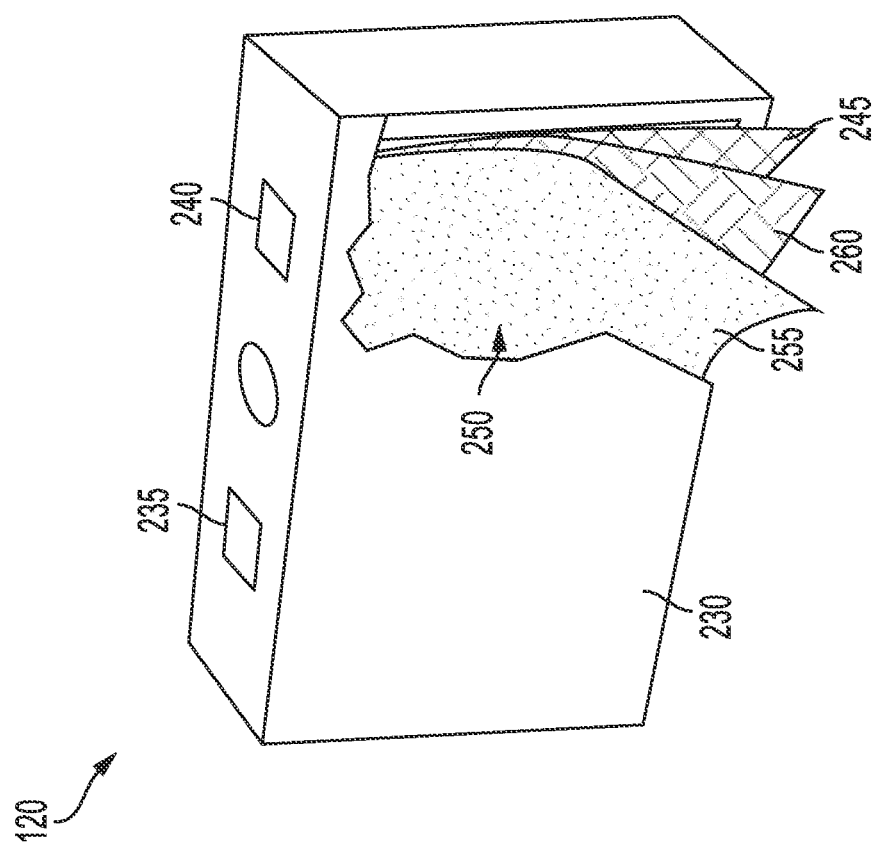
FIG. 2D depicts a cross sectional view of a battery cell, according to an example implementation.
Figure 2E:
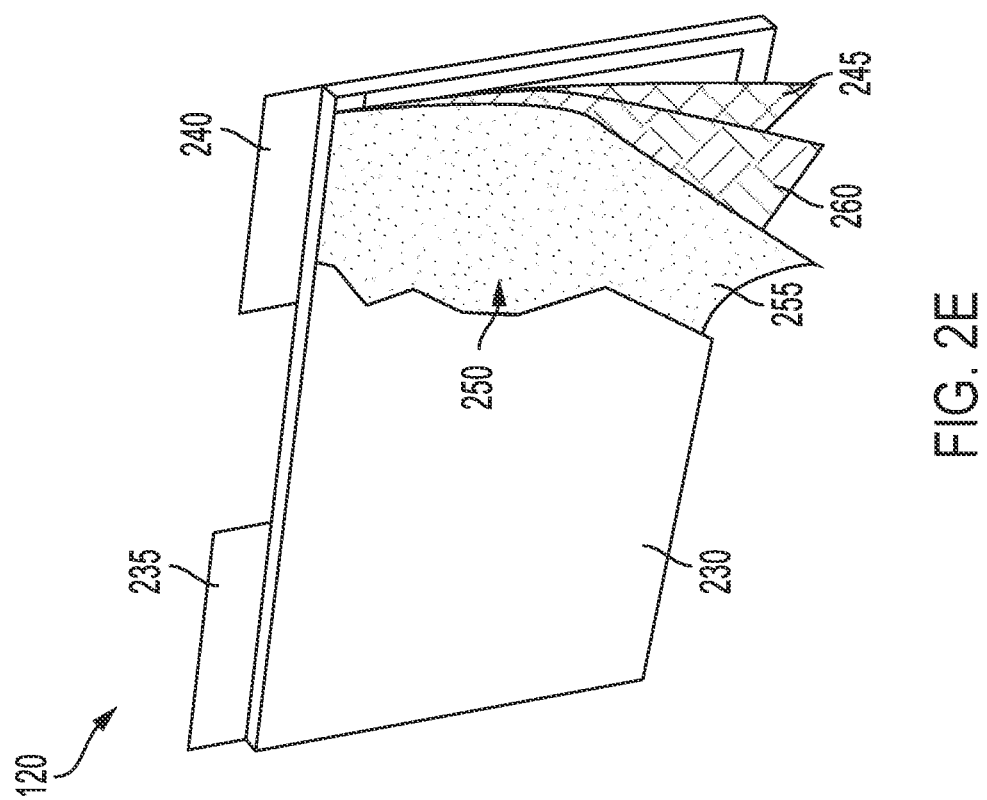
FIG. 2E depicts a cross sectional view of a battery cell, according to an example implementation.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid-state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid-state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_2$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium manganese iron phosphate (LMFP), a layered oxides ($LiMO_2$, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium manganese iron phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 is in contact with at least one layer of polymeric separator material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the electrolyte layer 260 from greater than 0 M to about 5 M.

FIG. 3 depicts a perspective view of an apparatus 300 (e.g., electrolyte formulation, multi-electrolyte formulation, improved electrolyte formulation). The apparatus 300 can include at least one battery cell 120 (e.g., lithium ion battery cell). The battery cell 120 can operate at high temperatures. For example, the battery cell 120 can operate at a temperature of greater than or equal to 45° C. The battery cell 120 can operate also operate at room temperature (25° C.) and at lower temperatures. For example, the battery cell 120 can operate at a temperature of less than or equal to −10° C. The battery cell 120 can generate gas upon cell formation or cycling. For example, the battery cell 120 can generate less than 0.05 mmol/min $O_2$ and less than 0.4 mmol/min $CO_2$. The amount of gas generated by the battery 120 can depend on the battery cell format, battery cell conditions (e.g., state of charge, C-rate, or temperature), state-of-health of the battery cell 120, chemistry of the battery cell 120, size of the battery cell 120, or electrochemical parameters of the battery cell 120. The battery cell 120 can generate $H_2$, $O_2$, $CO_2$, CO, hydrocarbons, or a combination thereof. For example, the battery cell 120 can generate methane gas or ethane gas. The battery cell 120 can generate intermediate P—F—O-like gas species, when reacting with electrolyte salt and/or solvent in a high voltage region.

The battery cell 120 can include at least one electrode 290. The electrode 290 can include the anode layer 245 or the cathode layer 255. The electrode 290 can be disposed within the cavity 250 defined by the housing 230. The electrode 290 can be disposed on a current collector 325. The electrode 290 can include a cathode having a voltage of greater than 3 V vs. $Li/Li^+$. For example, the cathode can have a voltage of greater than greater than 3 V vs. $Li/Li^+$, greater than 3.2 V vs. $Li/Li^+$, greater than 3.4 V vs. $Li/Li^+$, greater than 3.6 V vs. $Li/Li^+$, greater than 3.8 V vs. $Li/Li^+$, greater than 4 V vs. $Li/Li^+$, greater than 4.2 V vs. $Li/Li^+$, or greater than 4.4 V vs. $Li/Li^+$. The electrode 290 can include lithium iron phosphate, lithium manganese iron phosphate, lithium nickel manganese cobalt oxide, graphite, over-lithiated layered oxides, lithium manganese nickel oxide, or a combination thereof. The electrode 290 can include a manganese-containing cathode active material.

The apparatus 300 can include at least one first electrolyte 305 (e.g., first liquid electrolyte). The first electrolyte 305 can be disposed in the battery cell 120. For example, the first electrolyte 305 can be disposed within the cavity 250 defined by the housing. The first electrolyte 305 can include at least one salt. The salt can include $LiPF_6$, LiBOB, $LiBF_4$, LiDFOB, LiDFOP, LiFSI, LiTFSI, LiTf, $LiPF_2O_2$, LiFNFSI, LiDFBOP, LiBETI, $LiNO_3$, Li imidazolides, Na imidazolides, K imidazolides, or combinations thereof. The salt can include Na analogs or K analogs of the Li compounds listed above.

The first electrolyte 305 can have a salt concentration (e.g., first salt concentration). The salt concentration can include a concentration of one or more salts. The first electrolyte 305 can have a salt concentration greater than 1 M. For example, the first electrolyte 305 can have a salt concentration of greater than 1 M, greater than 2 M, greater than 3 M, greater than 4 M, greater than 5 M, or greater than 6 M. The first electrolyte 305 can have a salt concentration in a range of 1.1 M to 2.1 M, 1.1 M to 3.1 M, 1.1 M to 4.1 M, 1.1 M to 5.1 M, 2.1 M to 3.1 M, 2.1 M to 4.1 M, 2.1 M to 5.1 M, 3.1 M to 4.1 M, 3.1 M to 5.1 M, or 4.1 to 5.1 M. The first electrolyte 305 can have a salt concentration in a range of 1.105 M to 2.105 M, 1.105 M to 3.105 M, 1.105 M to 4.105 M, 1.105 M to 5.105 M, 2.105 M to 3.105 M, 2.105 M to 4.105 M, 2.105 M to 5.105 M, 3.105 M to 4.105 M, 3.105 to 5.105 M, or 4.105 to 5.105 M. The first electrolyte 305 can have a salt concentration in a range of 1.105 M to 2.1 M, 1.105 M to 3.1 M, 1.105 M to 4.1 M, 1.105 M to 5.1 M, 2.105 M to 3.1 M, 2.105 M to 4.1 M, 2.105 M to 5.1 M, 3.105 M to 4.1 M, 3.105 to 5.1 M, or 4.105 to 5.1 M. The first electrolyte 305 can have a salt concentration in a range of 1.1 M to 2.105 M, 1.1 M to 3.105 M, 1.1 M to 4.105 M, 1.1 M to 5.105 M, 2.1 M to 3.105 M, 2.1 M to 4.105 M, 2.1 M to 5.105 M, 3.1 M to 4.105 M, 3.1 to 5.105 M, or 4.1 to 5.105 M. The first electrolyte 305 can have a salt concentration in a range of 0.05 M to 0.1 M, 0.05 M to 0.2 M, 0.05 M to 0.5 M, 0.05 M to 1 M, 0.05 M to 2 M, 0.05 M to 5 M, 0.1 M to 0.2 M, 0.1 M to 0.5 M, 0.1 M to 1 M, 0.1 M to 2 M, 0.1 M to 5 M, 0.2 M to 0.5 M, 0.2 M to 1 M, 0.2 M to 2 M, 0.2 M to 5 M, 0.5 M to 1 M, 0.5 M to 2 M, 0.5 M to 5 M, 1 M to 2 M, 1 M to 5 M, or 2 M to 5 M.

The first electrolyte 305 can include at least one solvent. The solvent can include carbonates, esters, sulfones, fluorobenzene, or a combination thereof. For example, the solvent can include ethylene carbonate (EC), ethyl methyl carbonate (EMC), diethyl carbonate (DEC), dimethyl carbonate (DMC), fluoroethylene carbonate (FEC), propylene carbonate (PC), methyl phenyl carbonate (MPC), diphenyl carbonate (DPC), or fluorinated linear carbonates. The solvent can include methyl acetate (MA), methyl propanoate (MP), methyl butanoate (MB), ethyl propionate (EP), propyl propionate (PP), ethyl acetate (EA), butyl acetate (BA), butyl propionate (BP), or fluorinated esters. The solvent can include sulfolane (SL), butyl sulfone (BS), ethyl methyl sulfone (EMS), alkyl sulfones, ether sulfones, cyclic sulfones.

The solvent can have a concentration in a range of 0.01 vol % to 50 vol %. For example, the solvent can have a concentration in a range of 0.01 vol % to 0.1 vol %, 0.01 vol % to 0.5 vol %, 0.01 vol % to 1 vol %, 0.01 vol % to 10 vol %, 0.01 vol % to 25 vol %, 0.01 vol % to 50 vol %, 0.1 vol % to 0.5 vol %, 0.1 vol % to 1 vol %, 0.1 vol % to 10 vol %, 0.1 vol % to 25 vol %, 0.1 vol % to 50 vol %, 0.5 vol % to 1 vol %, 0.5 vol % to 10 vol %, 0.5 vol % to 25 vol %, 0.5 vol % to 50 vol %, 1 vol % to 10 vol %, 1 vol % to 25 vol %, 1 vol % to 50 vol %, 10 vol % to 25 vol %, 10 vol % to 50 vol %, or 25 vol % to 50 vol %.

The first electrolyte 305 can include at least one additive. The additive can enhance the cathode and anode interface stability. The additive can fortify the cathode and/or the anode interface. The additive can include carbonates, nitriles, phosphates, phosphites, borates, silianes, sulfur containing species, fluorine containing species, biphenyl, or a combination thereof. For example, the additive can include vinylene carbonate (VC) or vinyl ethylene carbonate (VEC). The additive can include dinitriles, trinitriles, or alkoxy nitriles. The additive can include tris(trimethylsilyl)phosphate (TMSPa), triphenyl phosphate. The additive can include tris(trimethylsilyl) phosphite. (TMSPi), triphenyl phosphite, or triethyl phosphite. The additive can include trimethyl borate, tris(trimethylsilyl) borate, or triisopropyl borate. The additive can include dimethoxydiphenylsilane, tetraethoxysilane, tetraethyl orthosilicate, or dimethoxydimethylsilane. The additive can include 1,3-propane sultone (PS), prop-1-ene-1,3-sultone (PES), methylene methanedisulfonate (MMDS), 1,3,2-dioxathiolane-2,2-dioxide (DTD), 4-methyl-1,3,2-dioxathiolane-2,2-dioxide (MDTD), ethylene sulfite (ES), 1,4-butane sultone (BS), or vinyl ethylene sulfite (VES). The additive can include fluorobenzene (FB), fluorinated ethers. The additive can include biphenyl. The additive can include nitriles, silanes, phosphates, phosphites, or $LiPO_2F_2$.

The additive can have a concentration in a range of 0.01 wt % to 10 wt %. For example, the solvent can have a concentration in a range of 0.01 wt % to 0.1 wt %, 0.01 wt % to 0.5 wt %, 0.01 wt % to 1 wt %, 0.01 wt % to 10 wt %, 0.01 wt % to 25 wt %, 0.01 wt % to 50 wt %, 0.1 wt % to 0.5 wt %, 0.1 wt % to 1 wt %, 0.1 wt % to 10 wt %, 0.1 wt % to 25 wt %, 0.1 wt % to 50 wt %, 0.5 wt % to 1 wt %, 0.5 wt % to 10 wt %, 0.5 wt % to 25 wt %, 0.5 wt % to 50 wt %, 1 wt % to 10 wt %, 1 wt % to 25 wt %, 1 wt % to 50 wt %, 10 wt % to 25 wt %, 10 wt % to 50 wt %, or 25 wt % to 50 wt %.

The apparatus 300 can include at least one first solid electrolyte interphase (SEI) 310. The first electrolyte 305 can form the first solid electrolyte interphase 310. For example, the first electrolyte 305 can form the first solid electrolyte interphase 310 on the electrode 290. The decomposition of first electrolyte 305 can form the first solid electrolyte interphase 310. The first electrolyte 305 can form the first solid electrolyte interphase 310 on the anode layer 245 or the cathode layer 255. The first solid electrolyte interphase 310 can partially or completely cover the electrode 290. The first solid electrolyte interphase 310 can be formed from the first electrolyte 305. The first solid electrolyte interphase 310 can be on (e.g., disposed on) the electrode 290.

The apparatus 300 can include at least one second electrolyte 315 (e.g., second liquid electrolyte). The second electrolyte 315 can be disposed in the battery cell 120. For example, the second electrolyte 315 can be disposed within the cavity 250 defined by the housing. The second electrolyte 315 can be the same as or different from the first electrolyte 305. The second electrolyte 315 can include at least one salt. The salt can include $LiPF_6$, LiBOB, $LiBF_4$, LiDFOB, LiDFOP, LiFSI, LiTFSI, LiTf, $LiPF_2O_2$, LiFNFSI, LiDFBOP, LiBETI, $LiNO_3$, Li imidazolides, Na imidazolides, K imidazolides, or a combination thereof. The salt can include Na analogs or K analogs of the Li compounds listed above.

The second electrolyte 315 can have a salt concentration (e.g., second salt concentration). The salt concentration can include a concentration of one or more salts. The second salt concentration can be less than the first salt concentration. The first salt concentration can be greater than the second salt concentration. The first electrolyte 305 can have a salt concentration greater than a salt concentration of the second electrolyte 310. The second electrolyte 310 can have a salt concentration less than a salt concentration of the first electrolyte 305. The ratio of the second salt concentration to the first salt concentration can be less than or equal to 3.0.

For example, ratio of the second salt concentration to the first salt concentration can be 3.0, 2.5, 2.0, 1.5, 1.0, 0.9, 0.8, 0.7, 0.6, 0.5, 0.4, 0.3, 0.2, or 0.1. The second electrolyte 315 can have a salt concentration in a range of 0 M to 0.1 M, 0 M to 0.5 M, 0 M to 1 M, 0 M to 2 M, 0 M to 3 M, 0 M to 4 M, 0 M to 5 M, 0.1 M to 0.5 M, 0.1 M to 1 M, 0.1 M to 2 M, 0.1 M to 3 M, 0.1 M to 4 M, 0.1 M to 5 M, 0.5 M to 1 M, 0.5 M to 2 M, 0.5 M to 3 M, 0.5 M to 4 M, 0.5 M to 5 M, 1 M to 2 M, 1 M to 3 M, 1 M to 4 M, 1 M to 5 M, 2 M to 3 M, 2 M to 4 M, 2 M to 5 M, 3 M to 4 M, 3 M to 5 M, or 4 M to 5 M.

The second electrolyte 315 can include at least one solvent. The solvent can include carbonates, esters, sulfones, fluorobenzene, or a combination thereof. For example, the solvent can include ethylene carbonate (EC), ethyl methyl carbonate (EMC), diethyl carbonate (DEC), dimethyl carbonate (DMC), fluoroethylene carbonate (FEC), propylene carbonate (PC), methyl phenyl carbonate (MPC), diphenyl carbonate (DPC), or fluorinated linear carbonates. The solvent can include methyl acetate (MA), methyl propanoate (MP), methyl butanoate (MB), ethyl propionate (EP), propyl propionate (PP), ethyl acetate (EA), butyl acetate (BA), butyl propionate (BP), or fluorinated esters. The solvent can include sulfolane (SL), butyl sulfone (BS), ethyl methyl sulfone (EMS), alkyl sulfones, ether sulfones, cyclic sulfones.

The solvent can have a concentration in a range of 0.01 vol % to 50 vol %. For example, the solvent can have a concentration in a range of 0.01 vol % to 0.1 vol %, 0.01 vol % to 0.5 vol %, 0.01 vol % to 1 vol %, 0.01 vol % to 10 vol %, 0.01 vol % to 25 vol %, 0.01 vol % to 50 vol %, 0.1 vol % to 0.5 vol %, 0.1 vol % to 1 vol %, 0.1 vol % to 10 vol %, 0.1 vol % to 25 vol %, 0.1 vol % to 50 vol %, 0.5 vol % to 1 vol %, 0.5 vol % to 10 vol %, 0.5 vol % to 25 vol %, 0.5 vol % to 50 vol %, 1 vol % to 10 vol %, 1 vol % to 25 vol %, 1 vol % to 50 vol %, 10 vol % to 25 vol %, 10 vol % to 50 vol %, or 25 vol % to 50 vol %.

The second electrolyte 315 can include at least one additive. The additive can enhance the cathode and anode interface stability. The additive can fortify the cathode and/or the anode interface. The additive can include carbonates, nitriles, phosphates, phosphites, borates, silianes, sulfur containing species, fluorine containing species, biphenyl, or a combination thereof. For example, the additive can include vinylene carbonate (VC) or vinyl ethylene carbonate (VEC). The additive can include dinitriles, trinitriles, or alkoxy nitriles. The additive can include tris(trimethylsilyl)phosphate (TMSPa), triphenyl phosphate. The additive can include tris(trimethylsilyl) phosphite. (TMSPi), triphenyl phosphite, or triethyl phosphite. The additive can include trimethyl borate, tris(trimethylsilyl) borate, or triisopropyl borate. The additive can include dimethoxydiphenylsilane, tetraethoxysilane, tetraethyl orthosilicate, or dimethoxydimethylsilane. The additive can include 1,3-propane sultone (PS), prop-1-ene-1,3-sultone (PES), methylene methanedisulfonate (MMDS), 1,3,2-dioxathiolane-2,2-dioxide (DTD), 4-methyl-1,3,2-dioxathiolane-2,2-dioxide (MDTD), ethylene sulfite (ES), (BS), or (VES). The additive can include (FB), fluorinated ethers. The additive can include biphenyl. The additive can include nitriles, silanes, phosphates, phosphites, or $LiPO_2F_2$.

The additive can have a concentration in a range of 0.01 wt % to 50 wt %. For example, the additive can have a concentration in a range of 0.01 wt % to 0.1 wt %, 0.01 wt % to 0.5 wt %, 0.01 wt % to 1 wt %, 0.01 wt % to 10 wt %, 0.01 wt % to 25 wt %, 0.01 wt % to 50 wt %, 0.1 wt % to 0.5 wt %, 0.1 wt % to 1 wt %, 0.1 wt % to 10 wt %, 0.1 wt % to 25 wt %, 0.1 wt % to 50 wt %, 0.5 wt % to 1 wt %, 0.5 wt % to 10 wt %, 0.5 wt % to 25 wt %, 0.5 wt % to 50 wt %, 1 wt % to 10 wt %, 1 wt % to 25 wt %, 1 wt % to 50 wt %, 10 wt % to 25 wt %, 10 wt % to 50 wt %, or 25 wt % to 50 wt %.

The second electrolyte 315 can reduce a viscosity of the first electrolyte 305. For example, first electrolyte 305 can have a first viscosity. The second electrolyte 315 can have a second viscosity. The first electrolyte 305 mixed with the second electrolyte 315 can have a third viscosity. The second viscosity can be less than the first viscosity. The third viscosity can be less than the first viscosity.

The second electrolyte 315 can reduce the salt concentration of the first electrolyte 305. For example, first electrolyte 305 can have a first salt concentration. The second electrolyte 315 can have a second salt concentration. The first electrolyte 305 mixed with the second electrolyte 315 can have a third salt concentration. The second salt concentration can be less than the first salt concentration. The third salt concentration can be less than the first salt concentration. The second electrolyte 315 can dilute the first electrolyte 305.

The apparatus 300 can include at least one second solid electrolyte interphase 320. The second electrolyte 315 can form the second solid electrolyte interphase 320. For example, the second electrolyte 315 can form the second solid electrolyte interphase 320 on the first solid electrolyte interphase 310. The decomposition of the second electrolyte 315 can form the second solid electrolyte interphase 320. The second solid electrolyte interphase 320 can partially or completely cover the first solid electrolyte interphase 310. The second solid electrolyte interphase 320 and the first solid electrolyte interphase 310 can form a dual solid electrolyte interphase. The second solid electrolyte interphase 320 can be formed from the second electrolyte 315. The second solid electrolyte interphase 320 can be on (e.g., disposed on) the first solid electrolyte interphase 310.

The first electrolyte 305 and the second electrolyte 315 can be formulated for high voltage cathodes (e.g., greater than 4.0 V vs. Li/Li$^+$). The first electrolyte 305 and the second electrolyte 315 can formulated for active material blends. Active material blends can include two different active materials (e.g., LFP/NMC, artificial graphite/natural graphite, Si/graphite, graphite/Li metal, etc.). The first electrolyte 305 and the second electrolyte 315 can formulated for extended temperature windows. For example, the first electrolyte 305 and the second electrolyte 315 can be stable and operate at a temperature of greater than or equal to 45° C. The first electrolyte 305 and the second electrolyte 315 can be stable and operate at a temperature of less than or equal to −10° C. The first electrolyte 305 and the second electrolyte 315 can formulated to reduce gassing. For example, the gas (e.g., $H_2$, $O_2$, $CO_2$, CO, hydrocarbons) generation from the cathode or the anode during electrochemical testing or storage can be reduced compared with control electrolytes. The first electrolyte 305 and the second electrolyte 315 can formulated to reduce transition metal dissolution.

For a target performance of low evaporation and high temperature stability, the apparatus 300 can include one or more salts (e.g., $X_1$, $X_2$, $X_{n+1}$, etc.). The concentration of a first salt (e.g., $X_1$) can be 0.2 M to 5 M. The concentration of a second salt (e.g., $X_2$) can be 0.05 M to 5 M. The concentration of additional salts (e.g., $X_{n+1}$) can be 0.05 M to 5 M. The apparatus 300 can include one or more solvents (e.g., $Y_1$, $Y_2$, $Y_{n+1}$, etc.). The concentration of a first solvent (e.g., $Y_1$) can be 0.5 vol % to 50 vol %. The concentration of a second solvent (e.g., $Y_2$) can be 0.5 vol % to 50 vol %. The concentration of additional solvents (e.g., $Y_{n+1}$) can be 0.01 vol % to 5 vol %. The apparatus 300 can include one or more additives (e.g., $Z_1$, $Z_2$, $Z_{n+1}$, etc.). The concentration of a first additive (e.g., $Z_1$) can be 0.01 wt % to 5 wt %. The concentration of a second solvent (e.g., $Z_2$) can be 0.01 wt % to 5 wt %. The concentration of additional solvents (e.g., $Z_{n+1}$) can be 0.01 wt % to 5 wt %.

For an application driving formulation, the apparatus 300 can include one or more salts (e.g., $X_1$, $X_2$, $X_{n+1}$, etc.). The concentration of the first salt (e.g., $X_1$) can be 0 M to 0.5 M. The concentration of the second salt (e.g., $X_2$) can be 0 M to 0.5 M. The concentration of additional salts (e.g., $X_{n+1}$) can be 0 M to 5 M. The apparatus 300 can include one or more solvents (e.g., $Y_1$, $Y_2$, $Y_{n+1}$, etc.). The concentration of the first solvent (e.g., $Y_1$) can be 0.5 vol % to 50 vol %. The concentration of the second solvent (e.g., $Y_2$) can be 0.5 vol % to 50 vol %. The concentration of additional solvents (e.g., $Y_{n+1}$) can be 0.01 vol % to 5 vol %. The apparatus 300 can include one or more additives (e.g., $Z_1$, $Z_2$, $Z_{n+1}$, etc.). The concentration of the first additive (e.g., $Z_1$) can be 0.01 wt % to 5 wt %. The concentration of the second solvent (e.g., $Z_2$) can be 0.01 wt % to 5 wt %. The concentration of additional solvents (e.g., $Z_{n+1}$) can be 0.01 wt % to 5 wt %.

Figure 4:
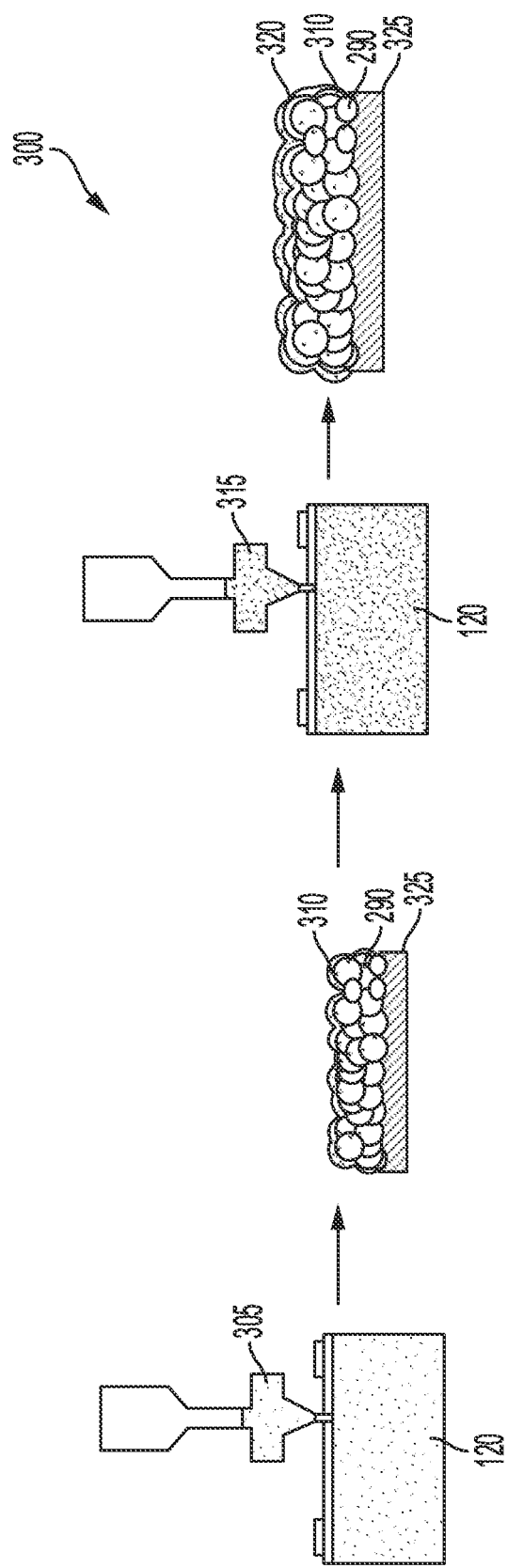
FIG. 4 depicts a perspective view of an apparatus, according to an example implementation.

FIG. 4 depicts a perspective view of the apparatus 300. The apparatus 300 can include the battery cell 120, the electrode 290, the first electrolyte 305, the first solid electrolyte interphase 310, the second electrolyte 315, the second solid electrolyte interphase 320, and the current collector 325.

The first electrolyte 305 can occupy a fill volume of the battery cell 120. The fill volume of the battery cell 120 can include a volume of the battery cell 120 available for filling. The fill volume of the battery cell 120 can include a volume of the battery cell 120 that a liquid can occupy. The first electrolyte 305 can occupy a fill volume of the battery cell 120 in a range of 5 vol % to 10 vol %, 5 vol % to 15 vol %, 5 vol % to 20 vol %, 5 vol % to 25 vol %, 5 vol % to 30 vol %, 5 vol % to 35 vol %, 5 vol % to 40 vol %, 5 vol % to 45 vol %, 5 vol % to 50 vol %, 5 vol % to 55 vol %, 5 vol % to 60 vol %, 5 vol % to 65 vol %, 5 vol % to 70 vol %, 5 vol % to 75 vol %, 5 vol % to 80 vol %, 5 vol % to 85 vol %, 5 vol % to 90 vol %, 5 vol % to 95 vol %, or 5 vol % to 100 vol %. The first electrolyte 305 can occupy a fill volume of the battery cell 120 in a range of 10 vol % to 15 vol %, 10 vol % to 20 vol %, 10 vol % to 25 vol %, 10 vol % to 30 vol %, 10 vol % to 35 vol %, 10 vol % to 40 vol %, 10 vol % to 45 vol %, 10 vol % to 50 vol %, 10 vol % to 55 vol %, 10 vol % to 60 vol %, 10 vol % to 65 vol %, 10 vol % to 70 vol %, 10 vol % to 75 vol %, 10 vol % to 80 vol %, 10 vol % to 85 vol %, 10 vol % to 90 vol %, 10 vol % to 95 vol %, or 10 vol % to 100 vol %. The first electrolyte 305 can occupy a fill volume of the battery cell 120 in a range of 15 vol % to 20 vol %, 15 vol % to 25 vol %, 15 vol % to 30 vol %, 15 vol % to 35 vol %, 15 vol % to 40 vol %, 15 vol % to 45 vol %, 15 vol % to 50 vol %, 15 vol % to 55 vol %, 15 vol % to 60 vol %, 15 vol % to 65 vol %, 15 vol % to 70 vol %, 15 vol % to 75 vol %, 15 vol % to 80 vol %, 15 vol % to 85 vol %, 15 vol % to 90 vol %, 15 vol % to 95 vol %, or 15 vol % to 100 vol %.

The second electrolyte 315 can occupy a fill volume of the battery cell 120. The fill volume of the battery cell 120 can include a volume of the battery cell 120 available for filling. The fill volume of the battery cell 120 can include a volume of the battery cell 120 that a liquid can occupy. The second electrolyte 315 can occupy a fill volume of the battery cell 120 in a range of 5 vol % to 10 vol %, 5 vol % to 15 vol %, 5 vol % to 20 vol %, 5 vol % to 25 vol %, 5 vol % to 30 vol %, 5 vol % to 35 vol %, 5 vol % to 40 vol %, 5 vol % to 45 vol %, 5 vol % to 50 vol %, 5 vol % to 55 vol %, 5 vol % to 60 vol %, 5 vol % to 65 vol %, 5 vol % to 70 vol %, 5 vol % to 75 vol %, 5 vol % to 80 vol %, 5 vol % to 85 vol %, 5 vol % to 90 vol %, 5 vol % to 95 vol %, or 5 vol % to 100 vol %. The second electrolyte 315 can occupy a fill volume of the battery cell 120 in a range of 10 vol % to 15 vol %, 10 vol % to 20 vol %, 10 vol % to 25 vol %, 10 vol % to 30 vol %, 10 vol % to 35 vol %, 10 vol % to 40 vol %, 10 vol % to 45 vol %, 10 vol % to 50 vol %, 10 vol % to 55 vol %, 10 vol % to 60 vol %, 10 vol % to 65 vol %, 10 vol % to 70 vol %, 10 vol % to 75 vol %, 10 vol % to 80 vol %, 10 vol % to 85 vol %, 10 vol % to 90 vol %, 10 vol % to 95 vol %, or 10 vol % to 100 vol %. The second electrolyte 315 can occupy a fill volume of the battery cell 120 in a range of 15 vol % to 20 vol %, 15 vol % to 25 vol %, 15 vol % to 30 vol %, 15 vol % to 35 vol %, 15 vol % to 40 vol %, 15 vol % to 45 vol %, 15 vol % to 50 vol %, 15 vol % to 55 vol %, 15 vol % to 60 vol %, 15 vol % to 65 vol %, 15 vol % to 70 vol %, 15 vol % to 75 vol %, 15 vol % to 80 vol %, 15 vol % to 85 vol %, 15 vol % to 90 vol %, 15 vol % to 95 vol %, or 15 vol % to 100 vol %.

Figure 5:
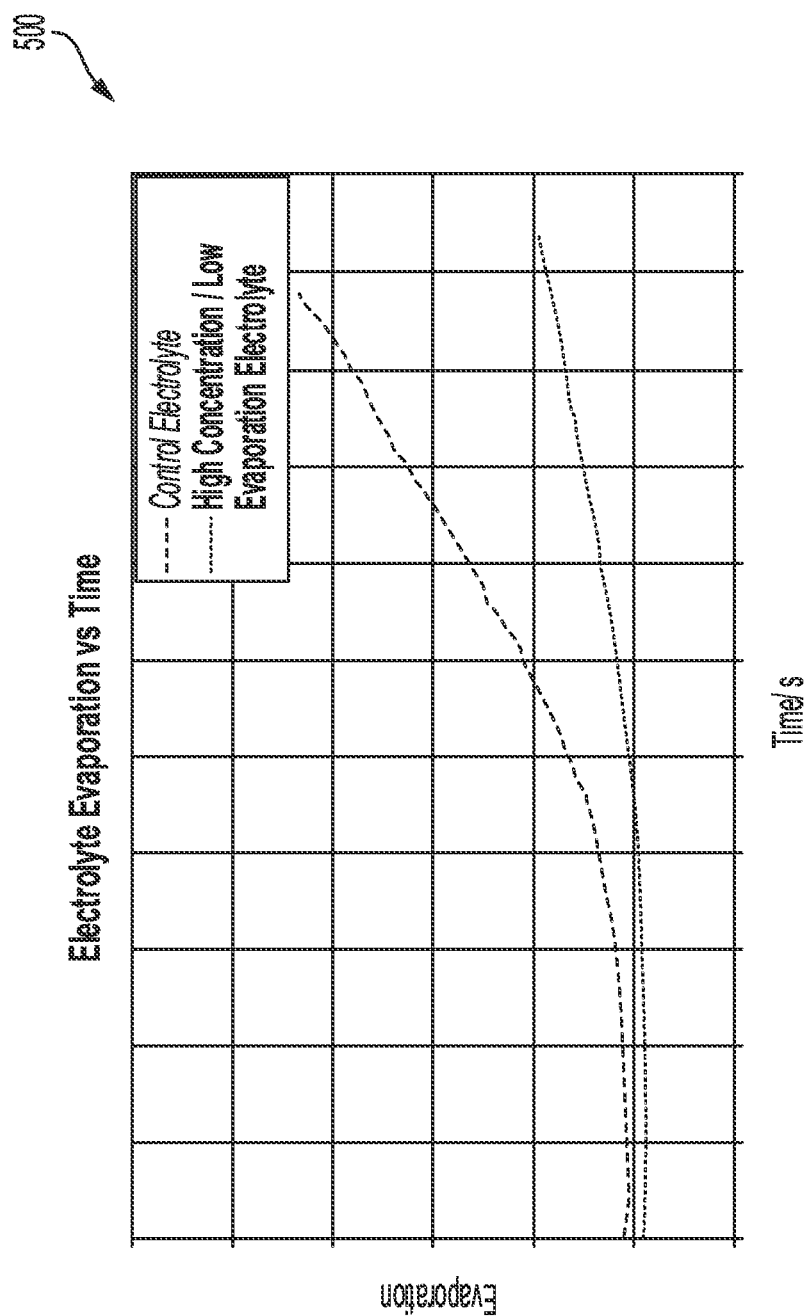
FIG. 5 depicts a plot of evaporation vs. time for an improved electrolyte formulation and a control electrolyte, according to an example implementation.

FIG. 5 depicts a plot 500 of evaporation vs. time for an improved electrolyte formulation (e.g., high-concentration electrolyte formulation, low evaporation electrolyte) and a control electrolyte. The improved electrolyte formulation can include a high concentration and/or low evaporation electrolyte. The improved formulation (e.g., electrolyte formulation, multi-electrolyte formulation) for filling processes (e.g., multi-filling processes, multi-step filling processes) can include the first electrolyte 305 and/or the second electrolyte 315. The multi-electrolyte formulation can include two or more electrolytes. The multi-filling processes can include two or more electrolyte filling steps. The evaporation rate of the first electrolyte 305 and/or the second electrolyte 315 can be lower than the evaporation rate of the control electrolyte. The salt concentration of the first electrolyte 305 and/or the second electrolyte 315 can be higher than the salt concentration of the control electrolyte.

Figure 6:
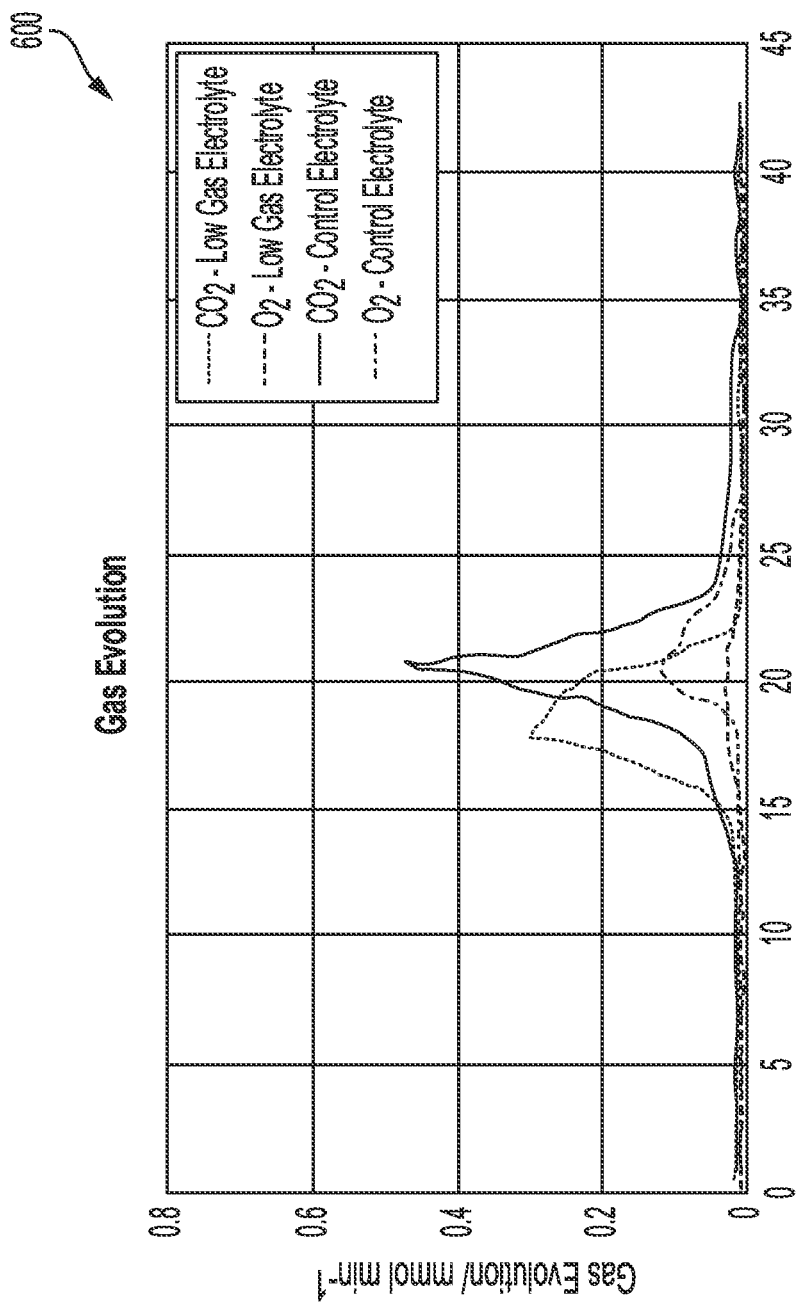
FIG. 6 depicts a plot of gas evolution vs. time for an improved electrolyte formulation and a control electrolyte, according to an example implementation.

FIG. 6 depicts a plot 600 of gas evolution vs. time for an improved electrolyte formulation and a control electrolyte. The improved electrolyte can include an electrolyte that generates less gas in the battery cell. The improved electrolyte formulation can include the first electrolyte 305 and/or the second electrolyte 315. The rate of gas evolution can be expressed in mmol/min. The time can be expressed in hours. The rate of gas evolution for $CO_2$ and $O_2$ are plotted. The rate of gas evolution for the improved electrolyte can be lower than the rate of gas evolution for the control electrolyte. The rate of $CO_2$ evolution for the improved electrolyte can be lower than the rate of $CO_2$ evolution for the control electrolyte. The rate of $O_2$ evolution for the improved electrolyte can be lower than the rate of $O_2$ evolution for the control electrolyte. The rate of gas evolution for the first electrolyte 305 and/or the second electrolyte 315 can be lower than the rate of gas evolution for the control electrolyte. The rate of $CO_2$ evolution for the first electrolyte 305 and/or the second electrolyte 315 can be lower than the rate of $CO_2$ evolution for the control electrolyte. The rate of $O_2$ evolution for the first electrolyte 305 and/or the second electrolyte 315 can be lower than the rate of $O_2$ evolution for the control electrolyte. The gas evolution for high voltage cathodes can be an irreversible process that occurs during the first slow charging cycle.

Figure 7:
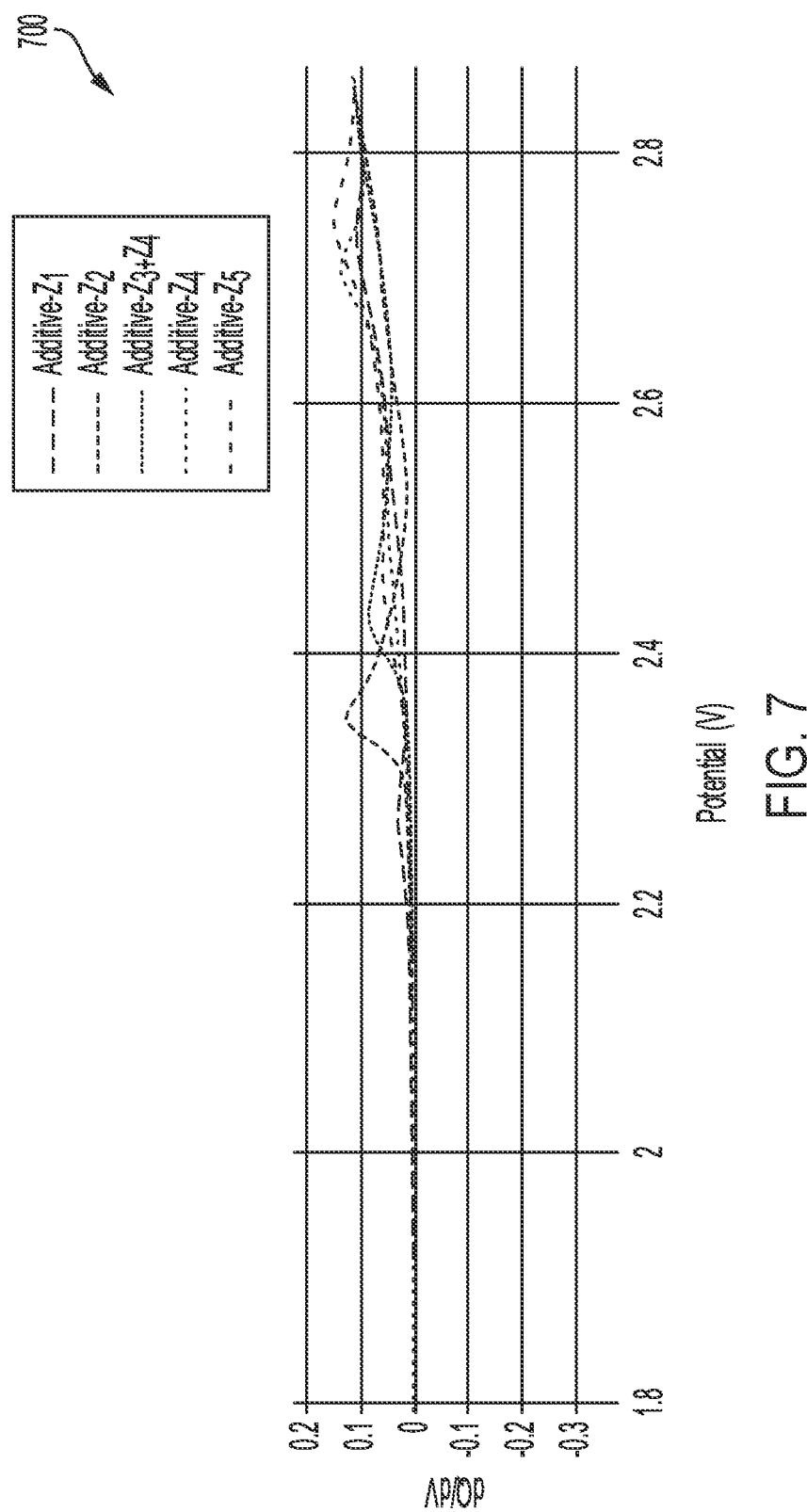
FIG. 7 depicts a plot of differential capacity vs. potential for multiple electrolyte formulations with different additives, according to an example implementation.

FIG. 7 depicts a plot 700 of differential capacity vs. potential for multiple electrolyte formulations with different additives. The electrolyte formulations can include the first electrolyte 305 and/or the second electrolyte 315. The electrolyte formulations can include one or more additives (e.g., $Z_1$, $Z_2$, $Z_3$, $Z_4$, $Z_5$, etc.) The potential can be expressed in volts. Differential capacity dQ/dV can track the capacity increase on charge or decrease in discharge as a function of voltage for an electrochemical system. This can provide a fingerprint for the decomposition of a specific additive at a given voltage which can become part of the SEI formation and/or decomposition. By using a mixture of additives, a dual SEI can be formed on the anode during the electrolyte fill and formation process.

Figure 8:
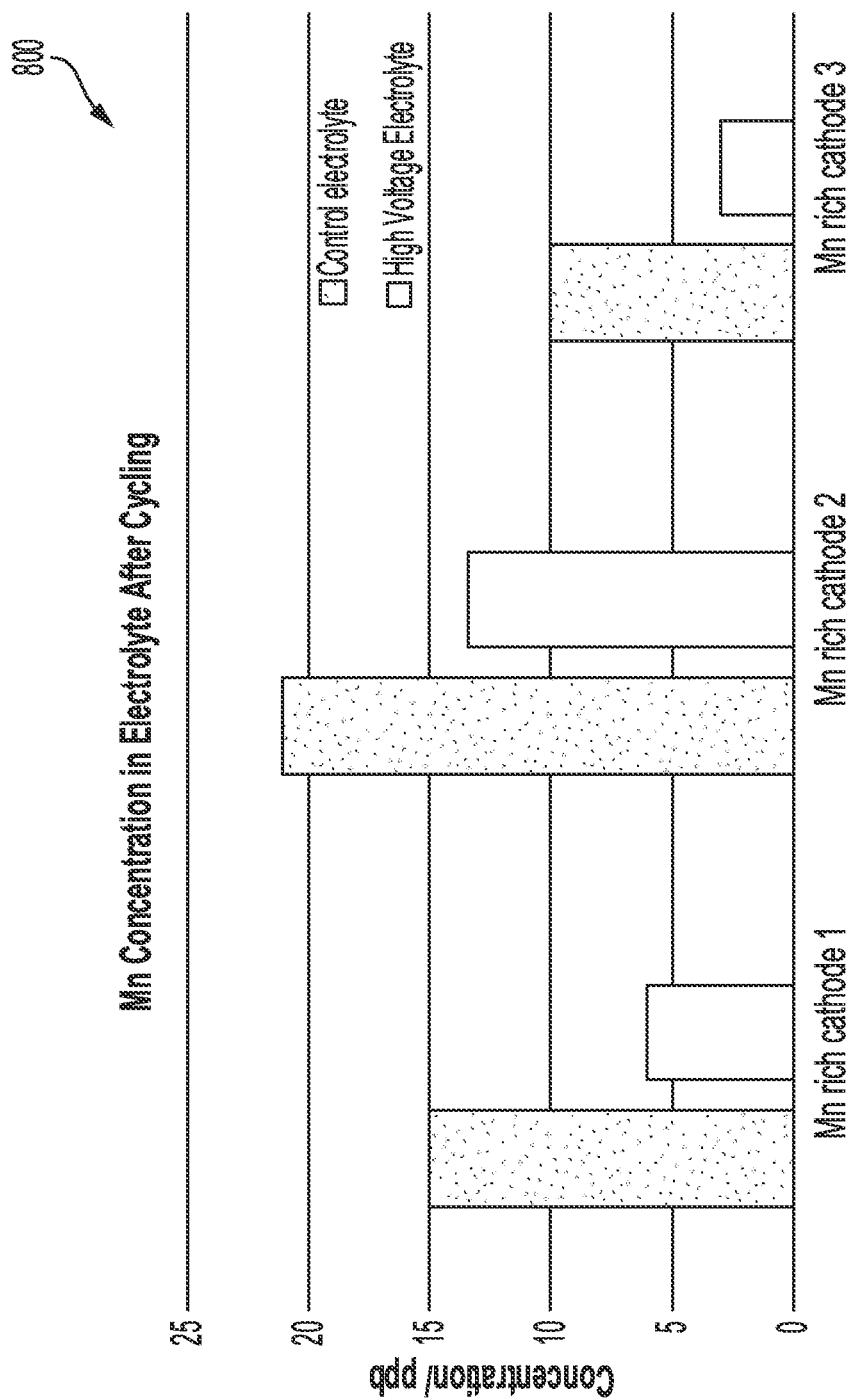
FIG. 8 depicts a graph of concentration of manganese dissolution in the liquid electrolyte for various cathodes, according to an example implementation.

FIG. 8 depicts a graph 800 of concentration of manganese dissolution in the electrolyte (e.g., liquid electrolyte) for various cathodes. The various cathodes can be tested with multi-electrolyte formulations and control electrolytes. The control electrolyte can include an electrolyte that is different from the first electrolyte 305 and/or the second electrolyte 315. The multi-electrolyte formulation can include a high voltage electrolyte. The multi-electrolyte formulation can include the first electrolyte 305 and/or the second electrolyte 315. The decomposition of the first electrolyte 305 can from the first solid electrolyte interphase 310. The decomposition of second electrolyte 315 can form the second solid electrolyte interphase 320. The concentration of manganese can be expressed in parts per billion (ppb). The concentration of manganese can be measured after cycling. The electrolyte can be characterized by Inductively Coupled Plasma Optical Emission spectroscopy (ICP-OES) using a small amount of electrolyte (e.g., 25 μL) and mixing it with an acid media. ICP-OES can measure the transition metal concentration in the electrolyte. The concentration of manganese ions (e.g., $Mn^{2+}$) of the first electrolyte 305 and/or the second electrolyte 315 can be less than the concentration of manganese ions of the control electrolyte. This may be due to the formation of R—O—Mn—O—R chemical bond that captures the $Mn^{2+}$ ion, rather than having the transition metal ions being solvated to the liquid electrolyte. This can reduce Mn dissolution, migration, and re-deposition on the anode side, which can lead to less cell overpotential during cycling.

Dissolved manganese ions can react with HF present in an electrolyte to form $MnF_2$ in a solid electrolyte interphase of a battery, and further reduction of $MnF_2$ within the electrochemical cell can lead to manganese metal formation and deposition at the anode. Such manganese metal can increase the polarization of the anode and increase the impedance resistance of the battery. This problem may arise in any battery including a Mn-containing cathode. The problem may particularly arise in a battery including a $Mn^{2+}$-containing cathode. The problem also may arise in a battery including a $Mn^{3+}$-containing cathode, where the $Mn^{3+}$ is subject to disproportional reaction to $Mn^{2+}$ and $Mn^{4+}$. A continuous electrochemical reduction of a $Mn^{4+}$-containing cathode, $Mn^{4+}$ may electrochemically reduce to $Mn^{3+}$. $Mn^{4+}$ is generally more stable species in such batteries under typical operating conditions, as compared to $Mn^{2+}$ or $Mn^{3+}$. Thus, in some aspects, the battery includes a $LiMn_aFe_{1-a}PO_4$ (LMFP) cathode, where $0 \leq a \leq 1$. In a LMFP cathode, Mn has an oxidation state of $2^+$. In some aspects, the battery includes a $LiMn_2O_4$ cathode. In a $LiMn_2O_4$ cathode, Mn has an oxidation state of $3^+$ and $4^+$. In some aspects, the battery includes a $Li(Ni_bCo_cMn_{1-b-c})O_2$ (NMC or NMCA) cathode. In NMC or NMCA (A is Aluminum), most Mn ions have an oxidation state of $4^+$.

The first electrolyte 305 can have a first concentration of manganese ions. The second electrolyte 315 can have a second concentration of manganese ions. The first concentration of manganese ions can be the same as or different from the second concentration of manganese ions. Tt least one of the first concentration of manganese ions or the second concentration of manganese ions can be less than a concentration of manganese ions in an electrolyte (e.g., control electrolyte) in a battery cell without the first electrolyte 305 and the second electrolyte 315.

At least one of the first solid electrolyte interphase 310 or the second solid electrolyte interphase 320 can be configured to capture manganese ions (e.g., free manganese ions) in at least one of the first electrolyte 305 or the second electrolyte 315. For example, the first solid electrolyte interphase 310 can capture manganese ions in at least one of the first electrolyte 305 or the second electrolyte 315. The second solid electrolyte interphase 320 can capture manganese ions in at least one of the first electrolyte 305 or the second electrolyte 315.

At least one of the first electrolyte 305 or the second electrolyte 315 can include an additive. The additive can form at least one of the first solid electrolyte interphase 310 or the second solid electrolyte interphase 320. The additive can form a chemical bond such as R—O—Mn—O—R. For example, the additive can form one or more R—O—Mn—O—R bonds to prevent dissolution of manganese ions. The additive can be selected from nitriles, silanes, phosphates, phosphites, and $LiPO_2F_2$.

Figure 9:
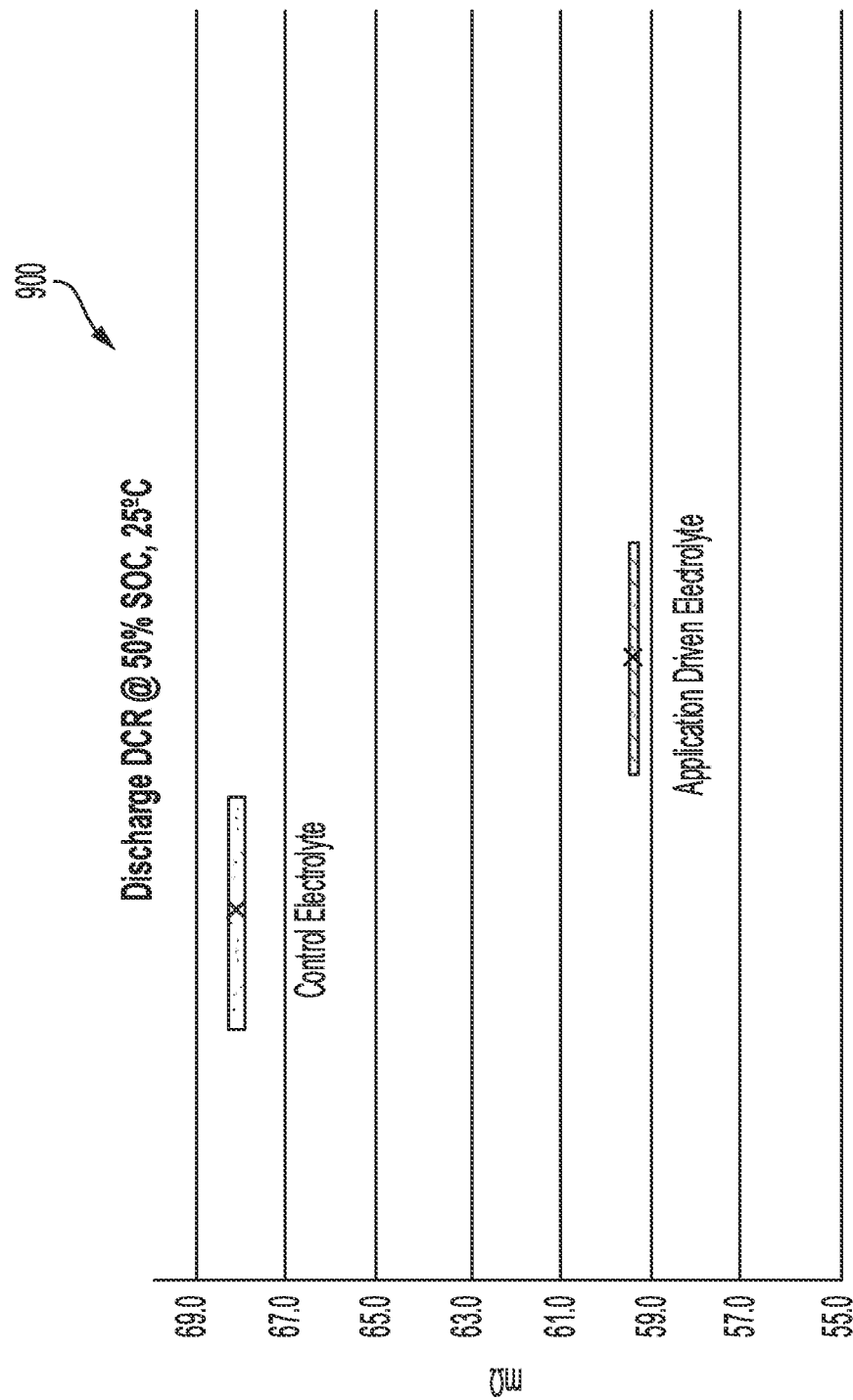
FIG. 9 depicts a graph of discharge direct current resistance (DCR) at 50% state-of-charge (SOC) at room temperature for an improved electrolyte formulation and a control electrolyte, according to an example implementation.

FIG. 9 depicts a graph 900 of discharge direct current resistance (DCR) for an improved electrolyte formulation (e.g., multi-electrolyte formulation) and a control electrolyte. The multi-electrolyte formulation can include an application driven electrolyte. The multi-electrolyte formulation can include the first electrolyte 305 and/or the second electrolyte 315. The discharge DCR can be measured at 50% state of charge (SOC) and at room temperature (e.g., 25° C.). The discharge DCR can show lower impedance for the first electrolyte 305. The impedance can be expressed in mΩ. The impedance of the first electrolyte 305 and/or the second electrolyte 315 can be less than the impedance of the control electrolyte.

Figure 10:
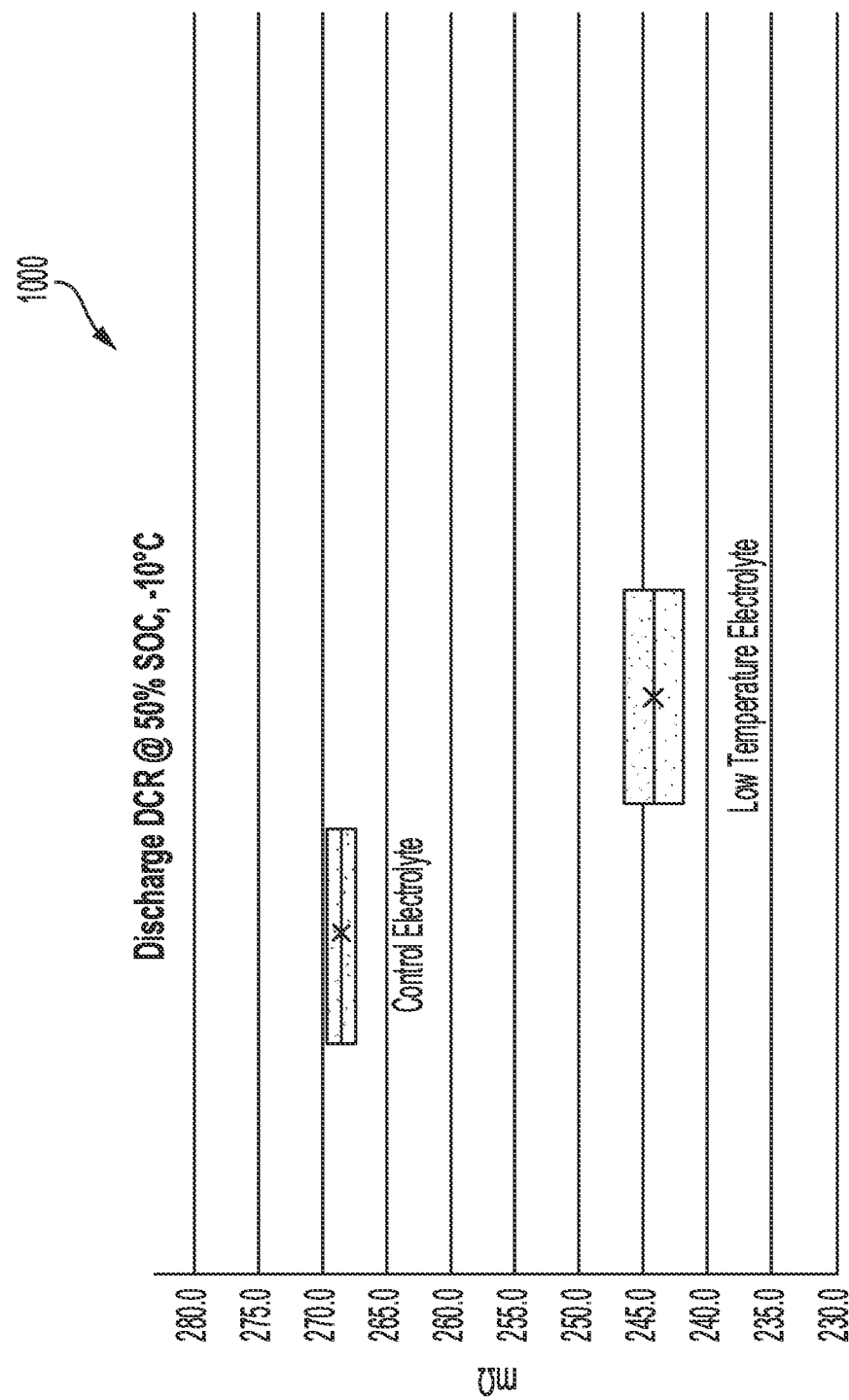
FIG. 10 depicts a graph of discharge direct current resistance (DCR) at 50% state-of-charge (SOC) at low temperature (−10° C.) for an improved electrolyte formulation and a control electrolyte, according to an example implementation.

FIG. 10 depicts a graph 1000 of discharge DCR for a multi-electrolyte formulation and a control electrolyte. The multi-electrolyte formulation can include a low temperature electrolyte. The multi-electrolyte formulation can include the first electrolyte 305 and/or the second electrolyte 315. The discharge DCR can be measured at 50% state of charge (SOC) and at a low temperature (e.g., −10° C.). The discharge DCR can show lower impedance for the first electrolyte 305. The impedance can be expressed in mΩ. The impedance of the first electrolyte 305 and/or the second electrolyte 315 can be less than the impedance of the control electrolyte.

Figure 11:
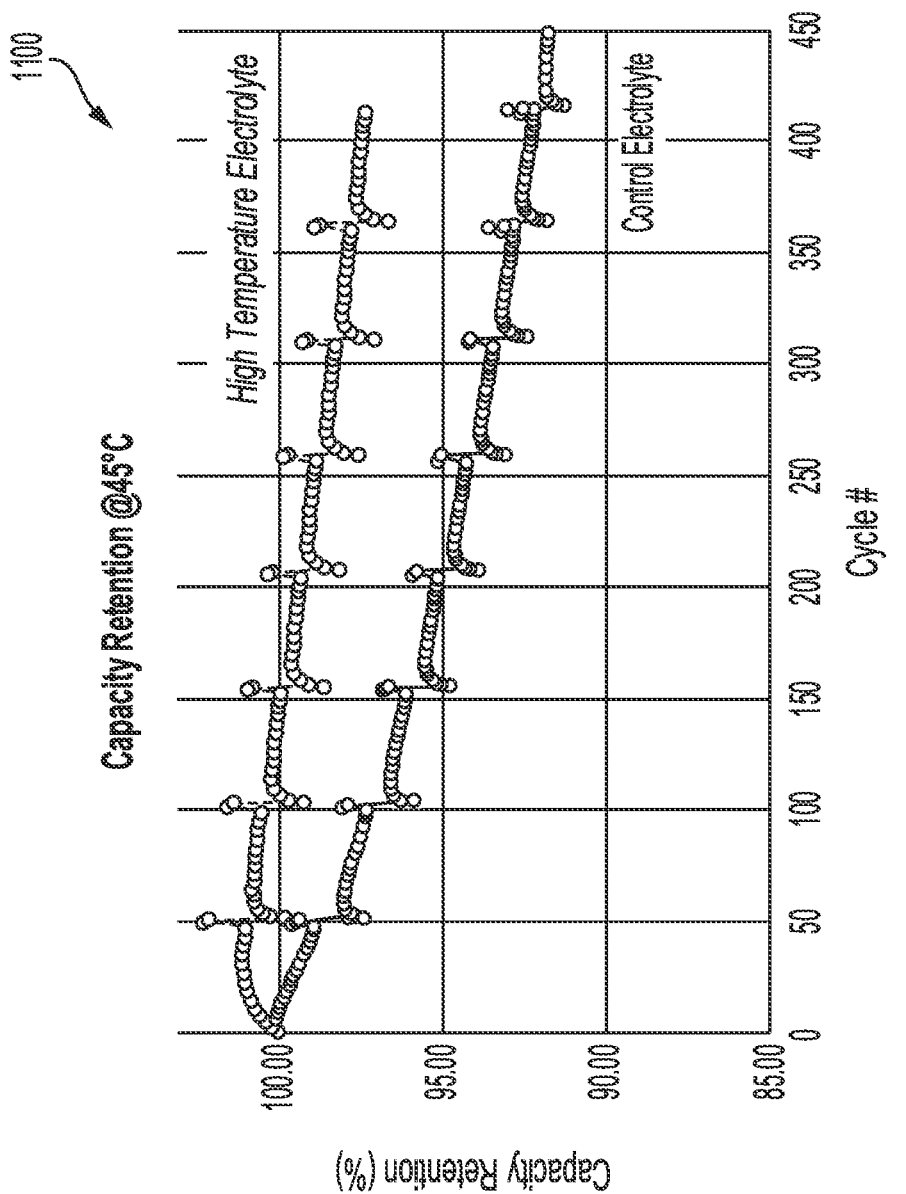
FIG. 11 depicts a plot of specific capacity retention in percentage for an improved electrolyte formulation and a control electrolyte, according to an example implementation.

FIG. 11 depicts a plot 1100 of specific capacity retention in percentage for an improved electrolyte formulation and a control electrolyte. The improved electrolyte formulation can include a high temperature electrolyte. The improved electrolyte formulation can include the first electrolyte 305 and/or the second electrolyte 315. The capacity retention can be measured at a high temperature (e.g., 45° C.). The capacity retention can be expressed in percent (%). The capacity retention of the first electrolyte 305 and/or the second electrolyte 315 can be greater than the capacity retention of the control electrolyte.

Figure 12:
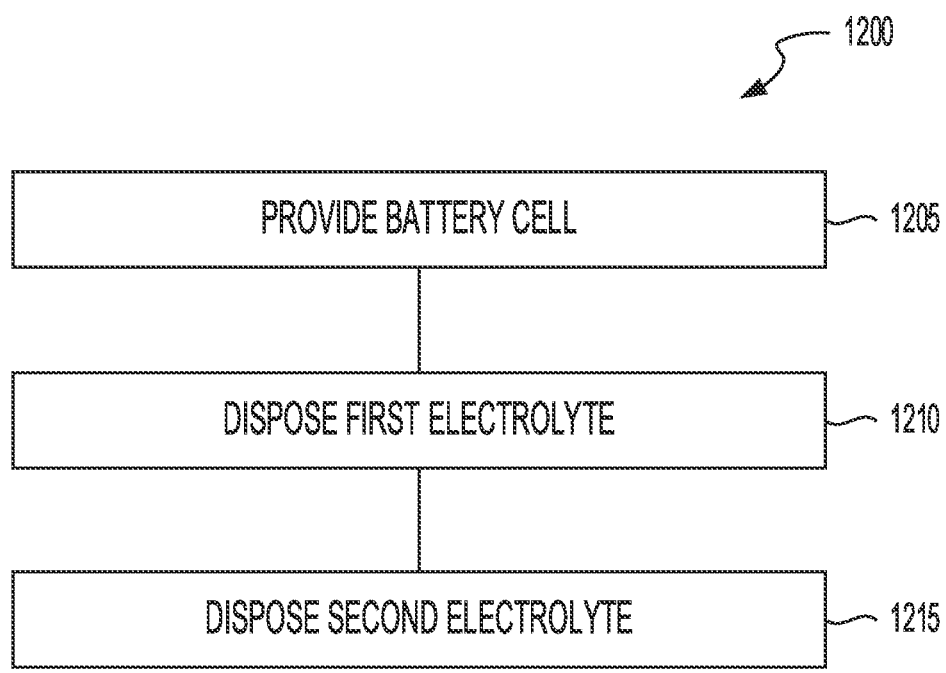
FIG. 12 depicts a method of filling a battery cell with electrolytes in a two-step manner, according to an example implementation.

FIG. 12 depicts a method 1200 of filling a battery cell with electrolytes in a two-step manner. The method 1200 can provide for reduced evaporation of electrolytes. The method 1200 can include providing the battery cell 120 (ACT 1205). The method 1200 can include disposing the first electrolyte 305 (ACT 1210). The method 1200 can include disposing the second electrolyte 315 (ACT 1215).

The method 1200 can include providing the battery cell 120 (ACT 1205). The battery cell 120 can include one or more materials with various electrical conductivity or thermal conductivity, or a combination thereof. The battery cell 120 can include the anode layer 245. The battery cell 120 can include the cathode layer 255. The battery cell 120 can include the electrolyte layer 260 disposed within the cavity 250. The battery cell 120 can include the electrode 290. The method 1200 can include operating the battery cell 120 at a temperature of greater than or equal to 45° C. The method 1200 can include operating the battery cell 120 at a temperature of less than or equal to −10° C.

The method 1200 can include disposing the first electrolyte 305 (ACT 1210). For example, the method 1200 can include disposing the first electrolyte 305 in the battery cell 120. The first electrolyte 305 can have a salt concentration greater than or equal to 1 M. The first electrolyte 305 can have the first salt concentration. The method 1200 can include filling the battery cell 120 with the first electrolyte 305 in a range of 10 vol % to 90 vol %. The method 1200 can include forming the first solid electrolyte interphase on the electrode. The first electrolyte 305 can form a first solid electrolyte interphase 310 on the electrode 290.

The method 1200 can include disposing the second electrolyte 315 (ACT 1215). For example, the method 1200 can include disposing the second electrolyte 315 in the battery cell 120. The second electrolyte 315 can be different from the first electrolyte 305. The second electrolyte can have the second salt concentration. The second salt concentration can be less than the first salt concentration. The method 1200 can include filling the battery cell 120 with the second electrolyte 315 in a range of 10 vol % to 90 vol %. The method 1200 can include forming the second solid electrolyte interphase 320 on the first solid electrolyte interphase 310. The second electrolyte 315 can form the second solid electrolyte interphase 320 on the first solid electrolyte interphase 310.

Figure 13:
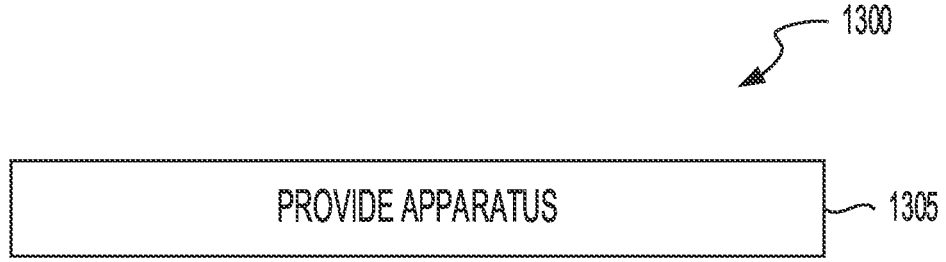
FIG. 13 depicts a method of providing an apparatus, according to an example implementation.

FIG. 13 depicts a method 1300 of providing an apparatus 300 (ACT 1305). The apparatus 300 can include the battery cell 120. The battery cell 120 can include the electrode 290. The apparatus 300 can include the first electrolyte 305 disposed in the battery cell 120. The first electrolyte 305 can have a salt concentration greater than or equal to 1 M. The first electrolyte 305 can form the first solid electrolyte interphase 310 on the electrode 290. The apparatus 300 can include the second electrolyte 315 disposed in the battery cell 120. The second electrolyte 315 can be different from the first electrolyte 305. The second electrolyte 315 can form the second solid electrolyte interphase 320 on the first solid electrolyte interphase 310.

The electric vehicle 105 can include the battery cell 120. The battery cell 120 can include the electrode 290. The electric vehicle 105 can include the first electrolyte 305 disposed in the battery cell 120. The first electrolyte 305 can have a salt concentration greater than or equal to 1 M. The first electrolyte 305 can form the first solid electrolyte interphase 310 on the electrode 290. The electric vehicle 105 can include the second electrolyte 315 disposed in the battery cell 120. The second electrolyte 315 can be different from the first electrolyte 305. The second electrolyte 315 can form the second solid electrolyte interphase 320 on the first solid electrolyte interphase 310.

The system can include the battery cell 120. The battery cell 120 can include the electrode 290. The system can include the first electrolyte 305 disposed in the battery cell 120. The first electrolyte 305 can have a salt concentration greater than or equal to 1 M. The first electrolyte 305 can form the first solid electrolyte interphase 310 on the electrode 290. The system can include the second electrolyte 315 disposed in the battery cell 120. The second electrolyte 315 can be different from the first electrolyte 305. The second electrolyte 315 can form the second solid electrolyte interphase 320 on the first solid electrolyte interphase 310.

The battery can include the electrode 290. The battery can include the first electrolyte 305 having a salt concentration greater than or equal to 1 M. The first electrolyte 305 can form the first solid electrolyte interphase 310 on the electrode 290. The battery can include the second electrolyte 315 different from the first electrolyte 305. The second electrolyte 315 can form the second solid electrolyte interphase 320 on the first solid electrolyte interphase 310.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations,"

"one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a battery cell comprising an electrode;
a first liquid electrolyte disposed in the battery cell;
a second liquid electrolyte disposed in the battery cell, the second liquid electrolyte different from the first liquid electrolyte;
a first solid electrolyte interphase on the electrode, the first solid electrolyte interphase formed from decomposition of the first liquid electrolyte having a salt concentration greater than or equal to 1 M; and
a second solid electrolyte interphase on the electrode, the second solid electrolyte interphase formed from decomposition of the second liquid electrolyte.

2. The apparatus of claim 1, comprising:
the second liquid electrolyte configured to reduce a viscosity of the first liquid electrolyte.

3. The apparatus of claim 1, comprising:
the first liquid electrolyte having the salt concentration in a range of 1.105 M to 5 M.

4. The apparatus of claim 1, comprising:
the first liquid electrolyte configured to occupy a fill volume of the battery cell in a range of 10 vol % to 90 vol %; and
the second liquid electrolyte configured to occupy the fill volume of the battery cell in a range of 10 vol % to 90 vol %.

5. The apparatus of claim 1, comprising:
at least one of the first liquid electrolyte and the second liquid electrolyte comprising a salt, the salt comprising $LiPF_6$, LiBOB, $LiBF_4$, LiDFOB, LiDFOP, LiFSI, LiTFSI, LiTf, $LiPF_2O_2$, LiFNFSI, LiDFBOP, LiBETI, $LiNO_3$, Li imidazolides, Na imidazolides, K imidazolides, or a combination thereof.

6. The apparatus of claim 1, comprising:
at least one of the first liquid electrolyte and the second liquid electrolyte comprising a solvent, the solvent comprising carbonates, esters, sulfones, fluorobenzene, or a combination thereof.

7. The apparatus of claim 1, comprising:
at least one of the first liquid electrolyte and the second liquid electrolyte comprising an additive, the additive comprising carbonates, nitriles, phosphates, phosphites, borates, silianes, sulfur containing species, fluorine containing species, biphenyl, or a combination thereof.

8. The apparatus of claim 1, wherein the salt concentration is a first salt concentration, the apparatus comprising:
the second liquid electrolyte having a second salt concentration, the second salt concentration less than the first salt concentration.

9. The apparatus of claim 1, comprising:
the second liquid electrolyte configured to reduce the salt concentration of the first liquid electrolyte.

10. The apparatus of claim 1, comprising:
the first liquid electrolyte having a first concentration of manganese ions;
the second liquid electrolyte having a second concentration of manganese ions; and
at least one of the first concentration of manganese ions or the second concentration of manganese ions is less than a concentration of manganese ions in an electrolyte in a battery cell without the first liquid electrolyte and the second liquid electrolyte.

11. The apparatus of claim 1, comprising:
the electrode comprising a manganese-containing cathode active material; and
at least one of the first solid electrolyte interphase or the second solid electrolyte interphase is configured to capture manganese ions in at least one of the first liquid electrolyte or the second liquid electrolyte.

12. An apparatus, comprising:
a battery cell comprising an electrode;
a first liquid electrolyte disposed in the battery cell;
a second liquid electrolyte disposed in the battery cell, the second liquid electrolyte different from the first liquid electrolyte;
a first solid electrolyte interphase on the electrode, the first solid electrolyte interphase formed from decomposition of the first liquid electrolyte; and
a second solid electrolyte interphase on the electrode, the second solid electrolyte interphase formed from decomposition of the second liquid electrolyte.

13. The apparatus of claim 12, comprising:
at least one of the first liquid electrolyte or the second liquid electrolyte comprises an additive configured to form at least one of the first solid electrolyte interphase or the second solid electrolyte interphase; and
the additive configured to form O—Mn—O bonds.

14. The apparatus of claim 12, comprising:
at least one of the first liquid electrolyte or the second liquid electrolyte comprises an additive configured to form at least one of the first solid electrolyte interphase or the second solid electrolyte interphase; and
the additive selected from nitriles, silanes, phosphates, phosphites, $LiPO_2F_2$, or combinations thereof.

15. A method, comprising:
providing a battery cell comprising an electrode;
disposing a first liquid electrolyte in the battery cell, the first liquid electrolyte configured to decompose to form a first solid electrolyte interphase on the electrode; and
disposing a second liquid electrolyte in the battery cell, the second liquid electrolyte different from the first liquid electrolyte and configured to decompose to form a second solid electrolyte interphase on the first solid electrolyte interphase.

16. The method of claim 15, comprising:
filling the battery cell with the first liquid electrolyte in a range of 10 vol % to 90 vol %;
forming the first solid electrolyte interphase on the electrode;
filling the battery cell with the second liquid electrolyte in a range of 10 vol % to 90 vol %; and
forming the second solid electrolyte interphase on the first solid electrolyte interphase.

17. The method of claim 15, wherein:
the first liquid electrolyte comprises a salt concentration greater than a salt concentration of the second liquid electrolyte.

18. The method of claim 15, wherein:
the first liquid electrolyte comprises a salt concentration in a range of 0.05 M to 5 M.

19. The method of claim 15, wherein:
the second liquid electrolyte comprising a salt concentration in a range of 0.1 M to 0.5 M.

20. The method of claim 15, wherein:
the first liquid electrolyte has a first salt concentration; and
the second liquid electrolyte has a second salt concentration, the second salt concentration is less than the first salt concentration.

21. The apparatus of claim 1, wherein the first liquid electrolyte and the second liquid electrolyte are not ionic liquid electrolytes.

22. The apparatus of claim 1, wherein the electrode comprises lithium iron phosphate.

* * * * *